United States Patent
Hagiwara et al.

(10) Patent No.: US 8,589,038 B2
(45) Date of Patent: Nov. 19, 2013

(54) HYDRAULIC DRIVE APPARATUS FOR CONSTRUCTION EQUIPMENT

(75) Inventors: Naoki Hagiwara, Tsuchiura (JP); Tsuyoshi Nakamura, Tsuchiura (JP); Kensuke Sato, Tsuchiura (JP); Yasuo Okano, Tsuchiura (JP); Kouji Ishikawa, Tsuchiura (JP); Masanori Ezawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 306 days.

(21) Appl. No.: 13/256,868

(22) PCT Filed: Mar. 15, 2010

(86) PCT No.: PCT/JP2010/054362
§ 371 (c)(1),
(2), (4) Date: Sep. 15, 2011

(87) PCT Pub. No.: WO2010/107002
PCT Pub. Date: Sep. 23, 2010

(65) Prior Publication Data
US 2012/0003069 A1 Jan. 5, 2012

(30) Foreign Application Priority Data
Mar. 16, 2009 (JP) .................. 2009-063384

(51) Int. Cl.
*E02F 9/22* (2006.01)
*F01N 3/023* (2006.01)
*E02F 3/43* (2006.01)

(52) U.S. Cl.
USPC .............. 701/50; 414/685; 417/212; 417/34; 60/295; 60/311; 60/286; 180/306

(58) Field of Classification Search
USPC ....... 701/50; 414/685; 60/295, 311; 417/212, 417/34
See application file for complete search history.

(56) References Cited

U.S. PATENT DOCUMENTS 5,446,981 A * 9/1995 Kamada et al. .................. 37/348
8,336,299 B2 * 12/2012 Kamiya et al. .................. 60/295

(Continued)

FOREIGN PATENT DOCUMENTS

| JP | 7-166840 A | 6/1995 |
| JP | 3073380 B2 | 8/2000 |

(Continued)

OTHER PUBLICATIONS

International Search Report dated Jun. 8, 2010 including English-language translation (Four (4) pages).

*Primary Examiner* — Thomas Black
*Assistant Examiner* — Wae Louie
(74) *Attorney, Agent, or Firm* — Crowell & Moring LLP

(57) ABSTRACT

A hydraulic drive system for a working machine provides improved safety during forced regeneration. Upon input of a forced regeneration command signal from a forced regeneration switch, a controller detects non-operated states of all hydraulic actuators such as an arm cylinder arranged on a hydraulic excavator based on a lock detection signal from a gate lock detection switch, and also an attitude of a front working mechanism. The attitude is proper from the standpoint of safety. The detection is based on an arm angle signal from an arm angle sensor, a bucket angle signal from a bucket angle sensor and a boom pressure signal from a boom pressure sensor. Taking the detection of the non-operated states and proper attitude as conditions, the controller outputs control signals to a boosting proportional solenoid valve and flow-rate controlling, proportional solenoid valve to make a forced regenerator conduct forced regeneration.

8 Claims, 8 Drawing Sheets

(56) References Cited

U.S. PATENT DOCUMENTS

| | | | |
|---|---|---|---|
| 8,516,805 B2* | 8/2013 | Hagiwara et al. | 60/295 |
| 2005/0155258 A1* | 7/2005 | Nishimura et al. | 37/403 |
| 2011/0000197 A1* | 1/2011 | Kamiya et al. | 60/295 |
| 2012/0000191 A1* | 1/2012 | Hagiwara et al. | 60/311 |
| 2012/0003069 A1* | 1/2012 | Hagiwara et al. | 414/685 |
| 2012/0163996 A1* | 6/2012 | Nakamura et al. | 417/34 |
| 2013/0074481 A1* | 3/2013 | Miura et al. | 60/311 |
| 2013/0173123 A1* | 7/2013 | Oouchida et al. | 701/50 |
| 2013/0209283 A1* | 8/2013 | Iwasaki et al. | 417/212 |
| 2013/0213020 A1* | 8/2013 | Ishikawa et al. | 60/311 |
| 2013/0221746 A1* | 8/2013 | Nakayama | 307/10.1 |

FOREIGN PATENT DOCUMENTS

| | | |
|---|---|---|
| JP | 2001-55762 A | 2/2001 |
| JP | 2003-155914 A | 5/2003 |
| JP | 2009-257323 A | 11/2009 |
| JP | 2010-59620 A | 3/2010 |

* cited by examiner

HYDRAULIC DRIVE APPARATUS FOR CONSTRUCTION EQUIPMENT

TECHNICAL FIELD

The present invention relates to a hydraulic drive system for a working machine such as a hydraulic excavator. The hydraulic drive system can be adopted in the working machine, is provided with an exhaust gas purification device for capturing, by a filter, particulate matter in exhaust gas produced in an engine (prime mover), and burns off particulate matter deposited on the filter to conduct so-called forced regeneration.

BACKGROUND ART

Conventionally, a hydraulic drive system for a working machine has been designed to permit detecting clogging of a filter in an exhaust gas purification device. When the working machine is in a non-operated state at the time of detection of clogging, the hydraulic drive system is set to automatically conduct forced regeneration. This forced regeneration conducted by the hydraulic drive system increases the delivery flow rate and delivery pressure of a hydraulic pump to increase the engine output, whereby the temperature of exhaust gas is raised. This increase in engine output leads to a rise in the temperature of exhaust gas. As a consequence, particulate matter with which the filter is clogged is burnt with the heat of the exhaust gas and is removed from the filter (see Patent Document 1).

PRIOR ART DOCUMENT

Patent Document

Patent Document 1: JP-B-3073380

DISCLOSURE OF THE INVENTION

Problem to be Solved by the Invention

In the above-described hydraulic drive system disclosed in Patent Document 1, it is a condition for forced regeneration that the working machine is in a non-operated state. However, what attitude a working element of the working machine should take upon forced regeneration is not taken into consideration as a condition. In a hydraulic drive system, a hydraulic pump is in an operated state during operation of an engine. It is, therefore, necessary to keep in mind that, even in a non-operated state in which all hydraulic actuators for driving a working machine are not operated, an unforeseen situation may arise and pressure oil may be fed to one or more of the hydraulic actuators. Upon conducting forced regeneration in the course of operation of the engine, it is hence desired not only that the working machine is in a non-operated state but also that, even if pressure oil is fed to one or more the hydraulic actuators, the work element is in an undrivable attitude or is in a safe attitude even if driven.

With the foregoing circumstances in view, the present invention has as an object thereof the provision of a hydraulic drive system for a working machine, which can provide improved safety during forced regeneration.

Means for Solving the Problem

To achieve the above-described object, the present invention is constituted as will be described next.

[1] The present invention is characterized in that in a hydraulic drive system for a working machine, said hydraulic drive system being provided with plural work hydraulic actuators for driving a work element constituting the working machine, a hydraulic pressure source for producing, by a hydraulic pump, pressure oil to be fed to the plural work hydraulic actuators, an engine as a drive source for the hydraulic pump, an exhaust gas purification device for capturing, by a filter, particulate matter in exhaust gas produced by the engine, a forced regeneration means for burning particulate matter deposited on the filter, and a control means for controlling the forced regeneration means, wherein the hydraulic drive system is further provided with a forced regeneration command means for commanding conduct of forced regeneration when operated, an attitude detection means for detecting a proper attitude specified beforehand as a safe attitude of the work element during forced regeneration, and a non-operated state detection means for detecting that all the hydraulic actuators for driving the working machine, said hydraulic actuators including the plural work hydraulic actuators, are in non-operated states; and taking as conditions for the conduct of forced regeneration that the non-operated states have been detected by the non-operated state detection means and the proper attitude has been detected by the attitude detection means, the control means makes the forced regeneration means conduct forced regeneration when the conduct of forced regeneration is commanded by the forced regeneration command means.

In the present invention as described above in [1], it is set as conditions for conducting forced regeneration that non-operated states of all the work hydraulic actuators have been detected by the non-operated state detection means and the proper attitude of the work element has been detected by the attitude detection means. Unless the work element has taken the pre-specified proper attitude as its safe attitude during forced regeneration, it is thus possible to prevent conducting forced regeneration even when all the work hydraulic actuators are in non-operated states. Accordingly, the working machine can be provided with improved safety during forced regeneration.

[2] The present invention may also be characterized in that in the invention as described above in [1], the plural work hydraulic actuators are single-rod hydraulic cylinders; control valves are arranged between the hydraulic pressure source and respective ones of the plural work hydraulic cylinders such that the control valves are switchable between feed states, in which pressure oil is fed from the hydraulic pressure source to the work hydraulic cylinders, and non-feed states, in which pressure oil is guided from the hydraulic pressure source to a hydraulic oil reservoir while cutting off flows of pressure oil from the hydraulic pressure source to the work hydraulic cylinders; the forced regeneration means has a boosting means capable of raising a delivery pressure of the hydraulic pump to a predetermined pressure by restricting lines downstream of all the control valves when all the control valves are in the non-feed states; and the attitude detection means detects, as an attribute of the proper attitude, that a specific cylinder out of the plural work hydraulic cylinders, said specific cylinder being drivable at the predetermined pressure, is in a stroke-end state on an extended side.

In the present invention as described above in [2], the forced regeneration means raises the delivery pressure of the pump, that is, the pressure of the hydraulic pressure source to the predetermined pressure by the boosting means upon forced regeneration. At this time, the respective work hydraulic cylinders and the hydraulic pressure source have been cut off by the corresponding control valves. When the boosting means is actuated and the pressure in the hydraulic circuit rises to the predetermined pressure, however, a potential problem may arise in that the predetermined pressure may act on some or all of the work hydraulic actuators by a leakage.

For example, a front working mechanism as a work element of a hydraulic excavator has a boom cylinder, arm cylinder and bucket cylinder as work hydraulic actuators formed of single-rod hydraulic cylinders. The boom cylinder is not actuated at the predetermined pressure required for forced regeneration, because the own weight of the front working mechanism always acts on the boom cylinder. However, the arm cylinder and bucket cylinder include those which may be driven at the predetermined pressure. These arm cylinder and bucket cylinder may each correspond to the specific cylinder in the present invention as described above in [2]. When both a rod chamber and a bottom chamber become equal in pressure to each other in a single-rod hydraulic cylinder, pressing force acts in an extending direction on a rod because a receiving surface in the bottom chamber is greater than that in the rod chamber. When the single-rod hydraulic cylinder is in the stroke-end state of the extended side, any further extension of the single-rod hydraulic cylinder is prevented so that the single-rod hydraulic cylinder is not actuated. Using the characteristics of this operation of the single-rod hydraulic cylinder in the present invention as described above in [2], no forced regeneration is conducted unless the attitude detection means has detected the stroke-end state of the specific cylinder on the extended side thereof. It is, therefore, possible to conduct forced regeneration while wiping out a possibility of false operation of the specific cylinder.

[3] The present invention may also be characterized in that in the invention as described above in [1] or [2], the control means makes the forced regeneration means stop forced regeneration when the conditions have become no longer satisfied during the conduct of forced regeneration.

[4] The present invention may also be characterized in that in the invention as described above in [1], the working machine is self-propelling, and has a travel hydraulic actuator as a drive source for self-traveling; actuation command means are arranged for the plural work hydraulic actuators and the travel hydraulic actuator, respectively, to produce command signals for the actuation of the respective hydraulic actuators depending on operations by corresponding parts of the body such as the hands and feet; an operation batch-invalidating means is arranged to create, in a batch for all the operation command means, operation-invalidated states in which neither the work hydraulic actuators are actuated even when the actuation command means corresponding to the work hydraulic actuators are operated nor the travel hydraulic actuator is actuated even when the actuation command means corresponding to the travel hydraulic actuator is operated; and the non-operated state detection means detects an actuated state of the operation batch-invalidating means as the non-operated states.

The present invention as described above in [4] has the construction provided with the operation batch-invalidating means, and this construction is commonly adopted in crawler working machines such as crawler hydraulic excavators among self-propelling working machines of different kinds. According to the present invention as described above in [4], it is hence possible to provide a hydraulic drive system of a crawler working machine with improved safety during forced regeneration.

[5] The present invention may also be characterized in that in the invention as described above in [1], the working machine is self-propelling, and has a travel hydraulic actuator as a drive source for self-traveling; actuation command means are arranged for the plural work hydraulic actuators and the travel hydraulic actuator, respectively, to produce command signals for the actuation of the respective hydraulic actuators depending on operations by corresponding parts of the body such as the hands and feet; a travel-operation invalidating means is arranged to create a travel-operation invalidated state in which the working machine does not travel even when the actuation command means corresponding to the travel hydraulic actuator is operated, and a work-operation invalidating means is also arranged to create a work-operation invalidated state in which the work hydraulic actuators are not actuated even when the actuation command means corresponding to the work hydraulic actuators are operated; and the non-operated state detection means detects as the non-operated states that the travel-operation invalidating means and work-operation invalidating means are both in operated states.

The present invention as described above in [5] has the construction provided with the travel-operation invalidating means and work-operation invalidating means, and this construction is commonly adopted in wheel working machines such as wheel hydraulic excavators among self-propelling working machines of different kinds. According to the present invention as described above in [5], it is hence possible to provide a hydraulic drive system of a wheel working machine with improved safety during forced regeneration.

[6] The present invention may also be characterized in that in the invention as described above in [1], the work element is a front working mechanism, and a grounded attitude of the front working mechanism is included as the attribute of the proper attitude.

Advantageous Effects of the Invention

According to the present invention, it is possible, as mentioned above, to prevent conducting forced regeneration even when all the work hydraulic actuators are in non-operated states, unless the work element has taken the proper attitude pre-specified as a safe attitude during forced regeneration. Therefore, the present invention can provide the working machine with improved safety during forced regeneration.

BRIEF DESCRIPTION OF THE DRAWINGS

FIG. 1-2 is a hydraulic circuit diagram showing in a simplified form a hydraulic drive system arranged in the crawler hydraulic excavator shown in FIG. 1-1.

FIG. 1-3 is a flow chart illustrating a flow of processing to be performed at a controller depicted in FIG. 1-2.

FIG. 1-4 is a perspective view of the inside of an operator's cab of the crawler hydraulic excavator illustrated in FIG. 1-1, as viewed from front of and obliquely above an operator's seat.

FIG. 2-1 is a left side view of a wheel hydraulic excavator as a self-propelling working machine according to a second embodiment of the present invention.

FIG. 2-2 is a hydraulic circuit diagram showing in a simplified form a hydraulic drive system arranged in the wheel hydraulic excavator illustrated in FIG. 2-1.

FIG. 2-3 is a flow chart illustrating a flow of processing to be performed at a controller shown in FIG. 2-2.

FIG. 2-4 is a perspective view of the inside of an operator's cab of the wheel hydraulic excavator illustrated in FIG. 2-2, as viewed from front of and obliquely above an operator's seat.

MODES FOR CARRYING OUT THE INVENTION

A description will be made about the first and second embodiments of the present invention.

[First Embodiment]

Figure 1:
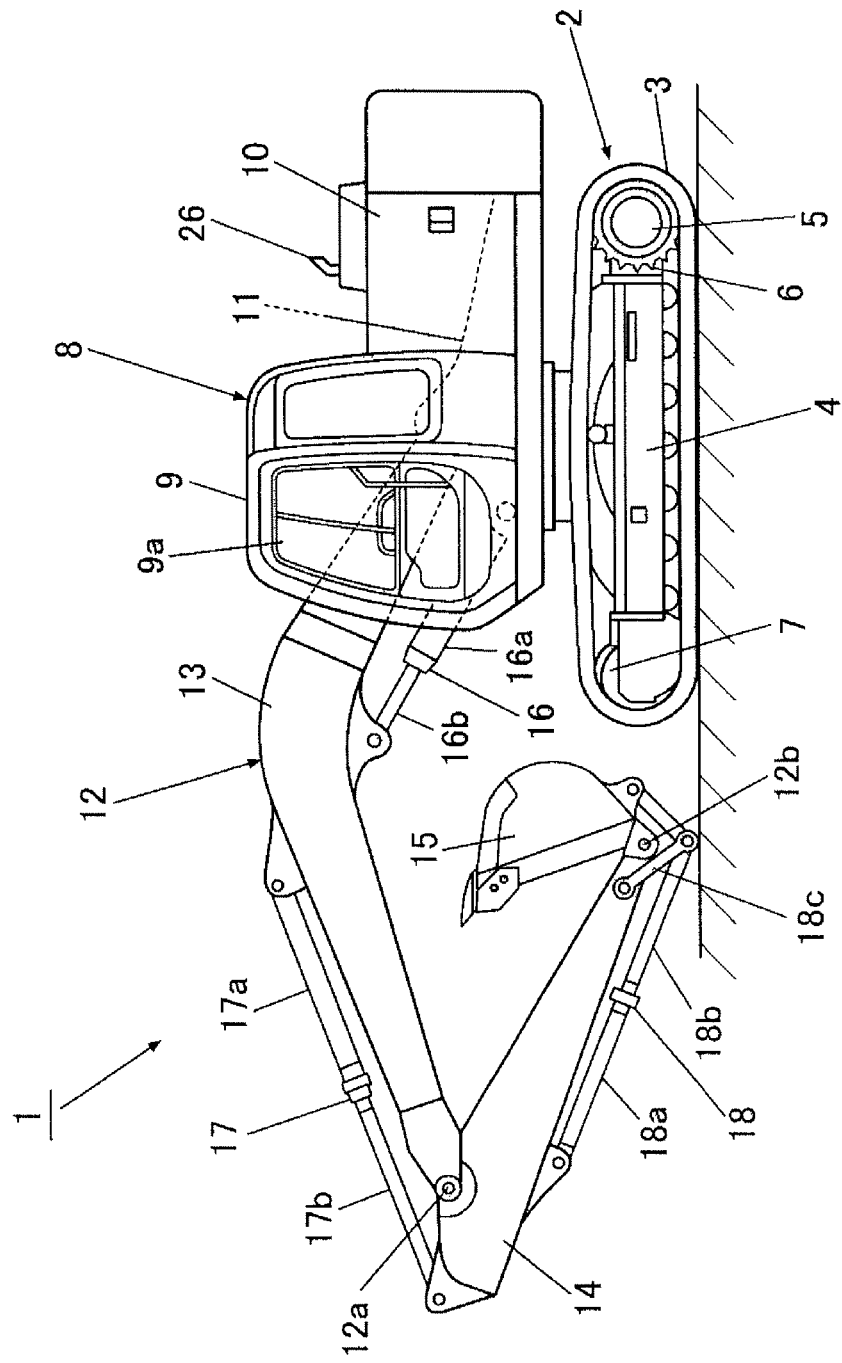
FIG. 1-1 is a left side view of a crawler hydraulic excavator as a self-propelling working machine according to a first embodiment of the present invention.
Figures 1, 2:
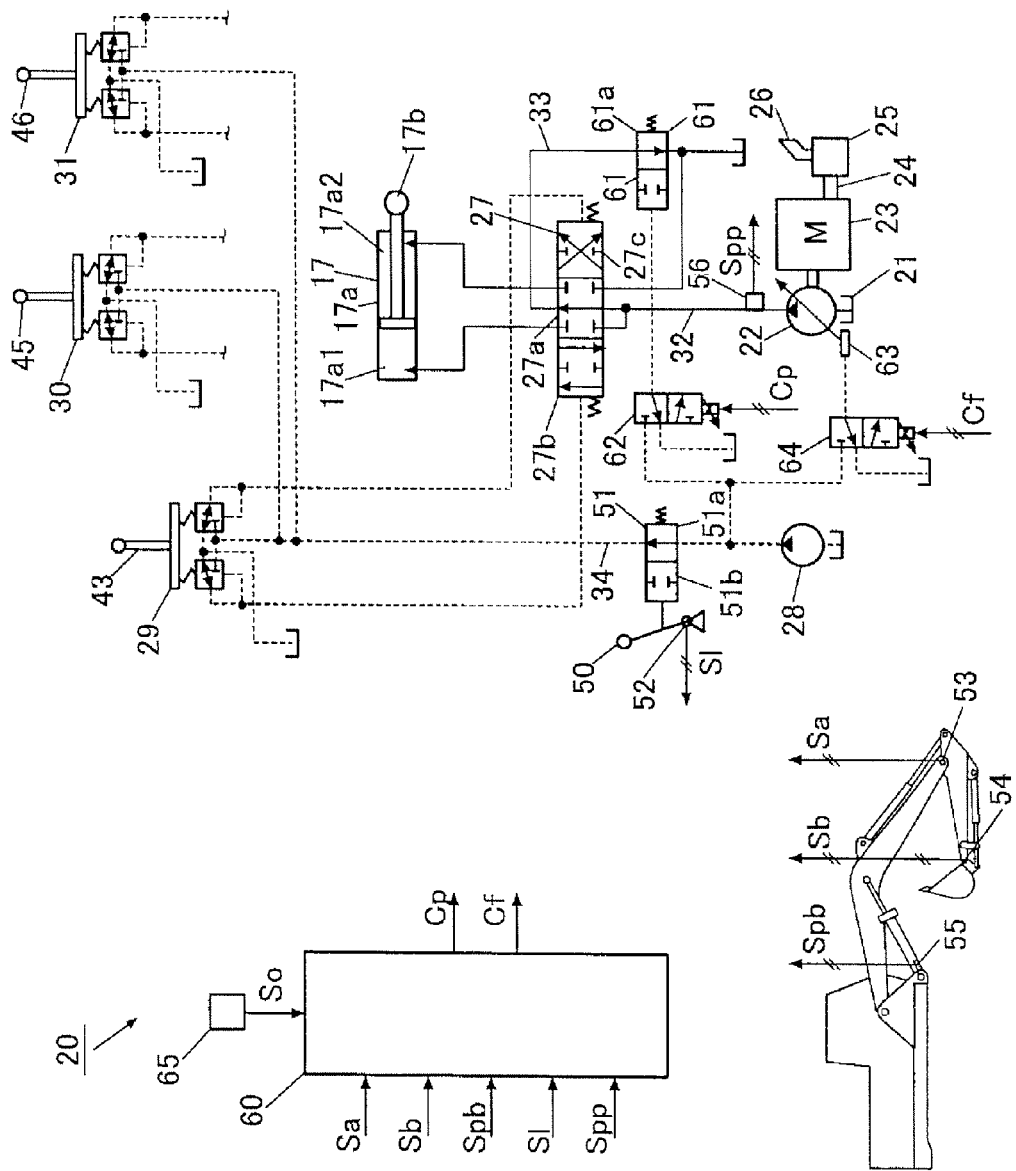
Figures 1, 2, 3:
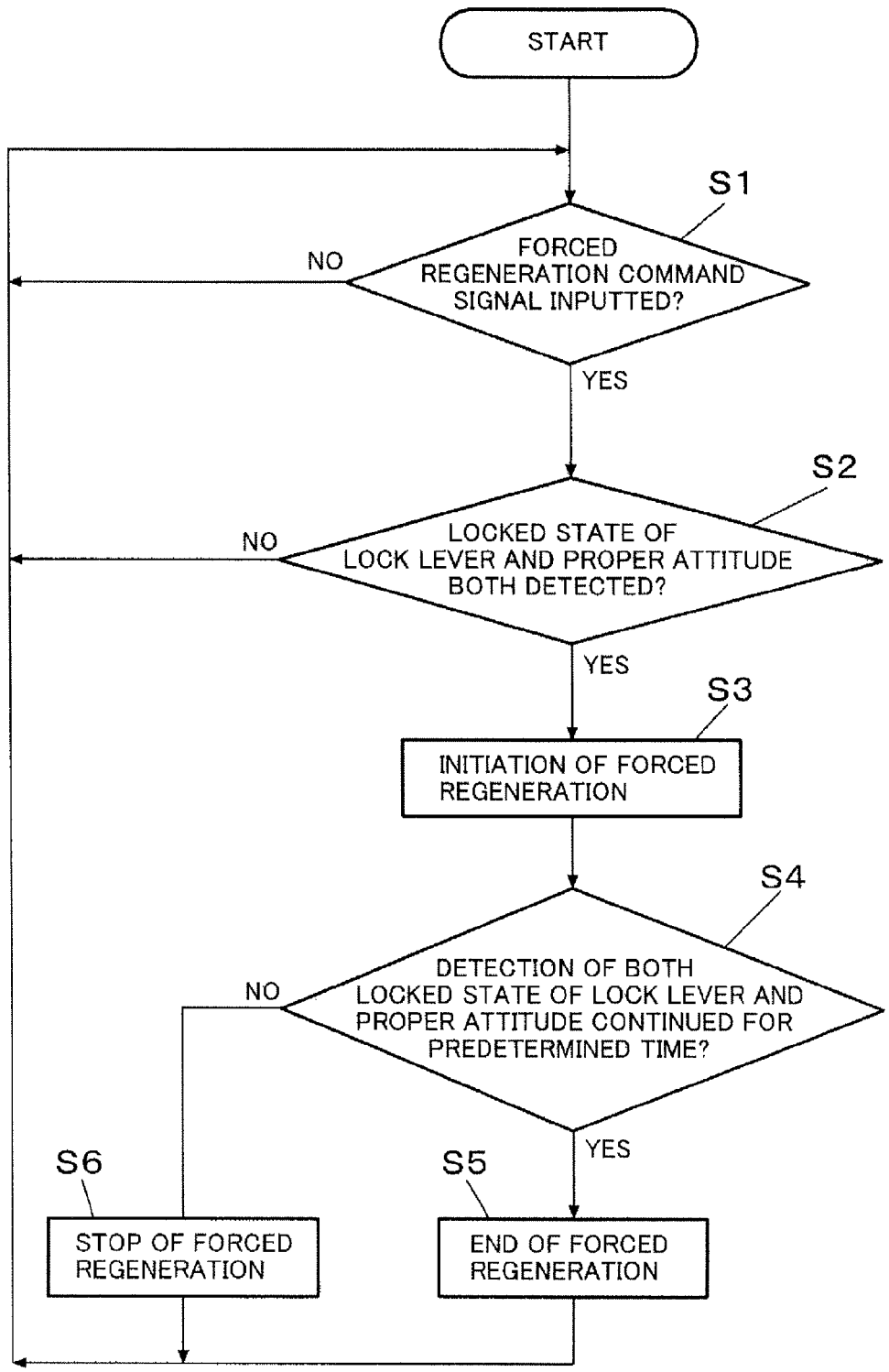

With reference to FIGS. 1-1 through 1-4, a description will be made about the first embodiment. FIG. 1-1 is a left side view of a crawler hydraulic excavator as a self-propelling working machine according to the first embodiment of the present invention. FIG. 1-2 is a hydraulic circuit diagram showing in a simplified form a hydraulic drive system arranged in the crawler hydraulic excavator shown in FIG. 1-1. FIG. 1-3 is a flow chart illustrating a flow of processing to be performed at a controller depicted in FIG. 1-2. FIG. 1-4 is a perspective view of the inside of an operator's cab of the crawler hydraulic excavator illustrated in FIG. 1-1, as viewed from front of and obliquely above an operator's seat.

As illustrated in FIG. 1-1, the crawler hydraulic excavator 1 (hereinafter simply called "the hydraulic excavator 1") is provided with a travel base 2 which runs by driving crawler tracks 3, a revolving upperstructure 8 swingably connected to the travel base 2, and a front working mechanism 12 substantially centrally arranged as a work element on a front section of the revolving upperstructure 8.

A left side section of the travel base 2 includes a track frame 4 as a framework structure. On a rear end portion of the track frame 4, a travel motor 5 is mounted, as a travel hydraulic actuator, integrally with a reduction gear box. The reduction gear box is arranged to drive a drive wheel 6. A driven wheel 7 is arranged on a front end portion of the track frame 4. The crawler track 3 is wrapped around the drive wheel 6 and driven wheel 7, and is located surrounding the track frame 4. By transmitting an output torque of the travel motor 5 to the crawler track 3 via the reduction gearbox and drive wheel 6, the crawler track 3 is driven around the track frame 4, and as a result, the crawler hydraulic excavator 1 travels. Similar to the left side section of the travel base 2, its right side section also has a construction provided with a track frame, travel motor (travel hydraulic actuator), drive wheel, driven wheel and crawler track.

On a left front section of the revolving upperstructure 8, an operator's cab 9 is mounted. Disposed behind the operator's cab 9 is an engine compartment 10, in which an engine 23 (diesel engine), main pump 22 (variable displacement hydraulic pump), and the like of a hydraulic drive system 20 to be mentioned subsequently herein are accommodated. From a top part of the engine compartment 10, an outlet pipe 26 extends to guide exhaust gas from the engine 23 outward of the hydraulic excavator 1.

The front working mechanism 12 is provided with a boom 13. The boom 13 of the front working mechanism 12 is pivotally connected at one end thereof via a pin to a foot part arranged in a front section of a frame 11 that constitutes the revolving upperstructure 8. To the opposite end of the boom 13, an arm 14 is pivotally connected at one end thereof via a pin. To the opposite end of the arm 14, a bucket 15 is pivotally connected at one end thereof via a pin. In FIG. 1-1, sign 12a indicates a pin joint at the other end of the boom 13 and the one end of the arm 14, and sign 12b designates a pin joint at the other end of the arm 14 and the one end of the bucket 15. The boom 13 is drivable by a boom cylinder 16 (single-rod hydraulic cylinder) as a work hydraulic actuator. This boom cylinder 16 is pivotally connected at a bottom-side end of a cylinder tube 16a to the hoot part via a pin, and is also pivotally connected at an end of a rod 16b to an intermediate part of the boom 8 via a pin. The arm 14 is drivable by an arm cylinder 17 (single-rod hydraulic cylinder) as a work hydraulic actuator. This arm cylinder 17 is pivotally connected at a bottom-side end of a cylinder tube 17a to the boom 13 via a pin, and is also pivotally connected at an end of a rod 17b to the one end of the arm 14 via a pin. The bucket 15 is arranged such that an extending/retracting motion of a bucket cylinder 18 (single-rod hydraulic cylinder) as a work hydraulic actuator is transmitted via a link mechanism 18c to drive the bucket 15. This bucket cylinder 18 is pivotally connected at a bottom-side end of a cylinder tube 18a to the arm 14 via a pin, and is also pivotally connected at an end of a rod 18b to the link mechanism 18c via a pin.

As depicted in FIG. 1-2, the hydraulic drive system 20 according to the first embodiment is provided with the left travel motor 5 and right travel motor (not shown) as travel hydraulic actuators which are a drive source for self-propelling of the hydraulic excavator 1, a swing motor (unillustrated hydraulic motor) as a work hydraulic actuator which is a drive source for the revolving upperstructure 8, the boom cylinder 16, arm cylinder 17 and bucket cylinder 18 as plural work hydraulic actuators for driving the front working mechanism 12. FIG. 1-2 depicts only the arm cylinder 17 and the remaining boom cylinder 16 and bucket cylinder 18 are omitted.

A hydraulic pressure source for a drive pressure, which drives these left travel motor 5, right travel motor, swing motor, boom cylinder 16, arm cylinder 17 and bucket cylinder 18, is the main pump 22. A drive source for this main pump 22 is the engine 23. An exhaust gas pipe 24 extends from the engine 23, and this exhaust gas pipe 24 is provided with an exhaust gas purification device 25. The exhaust gas purification device 25 serves to capture, by a filter, particulate matter in exhaust gas produced by the engine 23. From the exhaust gas purification device 25, the above-described outlet pipe 26 extends.

Between the main pump 22 and respective ones of the left travel motor 5, right travel motor, swing motor, boom cylinder 16, arm cylinder 17 and bucket cylinder 18, actuator control valves are interposed to control the flows of pressure oil to be fed from the main pump 22. FIG. 1-2 depicts, as a representative of these actuator control valves, only an arm cylinder control valve 27 interposed between the main pump 22 and the arm cylinder 17. This arm cylinder control valve 27 is a hydraulically-piloted, spring-centered, 3-position valve. Valve positions of the arm cylinder control valve 27 are set at an initial position 27a (neutral position), first operating position 27b and second operating position 27c. The initial position 27a (neutral position) is a valve position, in which a passage is formed to guide the delivery oil of the main pump 22 to a hydraulic oil reservoir 21 while cutting off a flow of pressure oil from the main pump 22 to either a bottom chamber 17a1 or a rod chamber 17a2 of the arm cylinder 17, in other words, is a valve position in which the arm cylinder control valve 27 is brought into a non-feed state. The first operating position 27b is a valve position, in which two passages are formed, one being a passage that guides the delivery oil of the main pump 22 to the bottom chamber 17a1 of the arm cylinder 17, and the other a passage that guides pressure oil, which is contained in the rod chamber 17a2, to the hydraulic oil reservoir 21, in other words, is a valve position in which the arm cylinder control valve 27 is brought into a first feed state to extend the arm cylinder 17. The second operating position 27c is a valve position, in which two passages are formed, one being a passage that guides the delivery oil of the main pump 22 to the rod chamber 17a2 of the arm cylinder 17, and the other a passage that guides pressure oil, which is contained in the bottom chamber 17a1, to the hydraulic oil reservoir 21, in other words, is a valve position in which the arm cylinder control valve 27 is brought into a second feed state to contract the arm cylinder 17.

The boom cylinder control valve and bucket cylinder control valve are of a similar construction as the arm cylinder control valve 27, the boom cylinder control valve is switchable to a non-feed state, first feed state or second feed-state with respect to the boom cylinder 16, and the bucket cylinder control valve is switchable to a non-feed state, first feed state or second feed-state with respect to the bucket cylinder 18.

The left travel motor control valve, right travel motor control valve and swing motor control valve are of a similar construction as the arm cylinder control valve 27. In an initial position (neutral position), however, a passage is formed to guide the delivery oil of the main pump 22 to the hydraulic oil reservoir 21 while cutting off a flow of pressure oil from the main pump 22 to any of the two inlet/outlet ports of a hydraulic motor as the travel motor or swing motor. In a first operating position, two passages are formed, one being a passage that guides the delivery oil of the main pump 22 to one of the inlet/outlet ports of the hydraulic motor, and the other a passage that guides pressure oil, which has been discharged from the other one of the inlet/outlet ports, to the hydraulic oil reservoir 21. In a second operating position, two passages are formed, one being a passage that guides the delivery oil of the main pump 22 to the other one of the inlet/outlet ports of the hydraulic motor, and the other a passage that guides pressure oil, which has been discharged from the one of the inlet/outlet ports of the hydraulic motor, to the hydraulic oil reservoir 21. The corresponding relations between the respective ones of the initial position, first operation position and second operating position and the respective ones of the non-feed state, first feed state and second feed state are similar to those in the arm cylinder control valve 27.

Using the delivery pressure of a pilot pump 28 (fixed displacement hydraulic pump) as a primary pressure, a pilot pressure to be applied to the arm cylinder control valve 27 is produced by an arm control device 29. Designated at numeral 30 is a left travel control device, which by using the delivery pressure of the pilot pump 28 as a primary pressure, produces a pilot pressure to be applied to the travel motor control valve arranged corresponding to the left travel motor 5. Indicated at numeral 31 is a right travel control device, which by using the delivery pressure of the pilot pump 28 as a primary pressure, produces a pilot pressure to be applied to the travel motor control valve arranged corresponding to the right travel motor. A pilot pressure to be applied to the boom cylinder control valve, a pilot pressure to be applied to the bucket cylinder control valve and a pilot pressure to be applied to the swing motor control valve are produced by a boom control device, bucket control device and swing control device of a similar construction as the arm control device 29, respectively, by using the delivery pressure of the pilot pump 28 as a primary pressure. These boom cylinder control valve, bucket cylinder control valve, swing motor control valve, boom control device, bucket control device and swing control device are omitted in FIG. 1-2. The arm control device 29, left travel control device 30, right travel control device 31, boom control device, bucket control device and swing control device are independently arranged in association with the arm cylinder 17, left travel motor 5, right travel motor, boom cylinder 16, bucket cylinder 18 and swing motor, respectively, and are actuation command means for producing pilot pressures as command signals for the actuation of the respective hydraulic actuators when operated by corresponding parts of the body such as the hands and feet.

As depicted in FIG. 1-4, a console 41 arranged laterally leftward of an operator's seat 40 is provided with a swing/arm control lever 43 which is tiltingly operated by the left hand. This swing/arm control lever 43 is shared by the swing control device and arm control device 29. The swing control device produces a pilot pressure responsive to a tilting operation of the swing/arm control lever 43 in a forward-to-rear direction, and the arm control device 29 produces a pilot pressure responsive to a tilting operation of the swing/arm control lever 43 in a left-to-right direction. A console 42 arranged laterally rightward of the operator's seat 40 is provided with a boom/bucket control lever 44 which is tiltingly operated by the right hand. This boom/bucket control lever 44 is shared by the boom control device and bucket control device. The boom control device produces a pilot pressure responsive to a tilting operation of the boom/bucket control lever 44 in the forward-to-rear direction, and the bucket control device produces a pilot pressure responsive to a tilting operation of the boom/bucket control lever 44 in the left-to-right direction.

From a floor 47 forward of the operator's seat 40, a left travel control lever 45 of the left travel control device 30 and a right travel control lever 46 of the right travel control device 31 extend upward side by side in lateral direction. A control pedal 45a is arranged integrally with a basal end portion of the left travel control lever 45, so that the left travel control lever 45 can be operated by either the hand or the foot. Likewise, a control pedal 46a is arranged integrally with a basal end portion of the right travel control lever 46. Concerning the left travel control lever 45 and the right travel control lever 46, tilting operations in the forward direction are operations that command a forward travel, tilting operations in the rearward direction are operations that command a rearward travel, tilt amounts are operations that command travel speeds, and tilting operation strokes with a difference set therebetween are operations that command a steering.

As shown in FIG. 1-2, a pilot line 34 extends from the pilot pump 28. Through this pilot line 34, the delivery oil of the pilot pump 28 is distributed to all the control devices such as the above-mentioned arm control device 29. This pilot line 34 is provided with a gate lock on/off valve 51 which can collectively cut off the primary pressure to all the control devices. This gate lock on/off valve 51 is an operation batch-invalidating means for creating, in a batch for all the control devices, operation-invalidated states in which neither the work hydraulic actuators such as the arm cylinder 17 are actuated even when the control devices such as the arm control device 29 corresponding to the work hydraulic actuators are operated nor the travel hydraulic motors such as the travel motor 5 are actuated even when the left travel control device 30 and the like corresponding to the travel hydraulic actuators are operated.

The gate lock on/off valve 51 is a lever-operated, spring return valve, and is operated by a gate lock lever 50. In this gate lock on/off valve 51, an initial position corresponds to an open position 51a, and an operating position corresponds to a closed position 51b. In the closed position 51b of the gate lock on/off valve 51, the pilot line 34 is closed to collectively cut off the primary pressure to all the control devices such as the arm control device 29. The gate lock lever 50 can be selectively held by an unillustrated construction in a locked position corresponding to the valve position of the gate lock on/off valve 51 or in a canceled position corresponding to the open position of the gate lock on/off valve 51. As depicted in FIG. 1-4, the gate lock lever 50 is arranged laterally leftward of the left console 41, that is, between the console 41 and a door 9*a* (see FIG. 1-1).

Attached to the gate lock lever 50 is a lock detection switch 52, which detects that the gate lock lever 50 is in a locked position, in other words, in a locked state, and outputs a lock detection signal S1 (electrical signal). The lock detection signal S1 is inputted to a controller 60.

On the pin joint 12*a* for the boom 13 and arm 14, an arm angle sensor 53 is arranged to output an arm angle detection signal Sa (electrical signal) corresponding to an angle of the arm 14 relative to the boom 13. On the pin joint 12*b* for the arm 14 and the bucket 15, a bucket angle sensor 54 is arranged to output a bucket angle detection signal Sb (electrical signal) corresponding to an angle of the bucket 15 relative to the arm 14. The arm angle detection signal Sa and bucket angle detection signal Sb are also inputted to the controller 60.

The cylinder tube 16*a* of the boom cylinder 16 is provided with a boom pressure sensor 55, which outputs a boom pressure detection signal Spb (electrical signal) corresponding to a pressure inside the bottom chamber of the boom cylinder 16. This boom pressure detection signal Spb is also inputted to the controller 60.

A main line 32, which guides a delivery pressure from the main pump 22 to parallel circuits, is provided with a delivery pressure sensor 56, which outputs a delivery pressure detection signal Spp (electrical signal) corresponding to the delivery pressure of the main pump 22. This delivery pressure detection signal Spp is also inputted to the controller 60.

The above-described plural actuator control valves such as the arm cylinder control valve 27 form the parallel circuits between themselves and the main pump 22. A return line 33, which extends from the parallel circuits to the hydraulic oil reservoir 21, is provided with a boosting on/off valve 61 capable of opening or closing the return line 33. This boosting on/off valve 61 is a hydraulically-piloted valve. By a boosting proportional solenoid valve 62, a pilot pressure to be applied to this boosting on/off valve 61 is produced using the delivery pressure of the pilot pump 28 as a primary pressure. The opening degree of the boosting on/off solenoid valve 61 changes steplessly, as its valve element displaces between an open position 61*a* (initial position) and a closed position 61*b* (operating position) depending on the level of the pilot pressure. This boosting on/off valve 61 is a boosting means for raising the delivery pressure of the main pump 22 by restricting lines downstream of all the actuator control valves (the boom cylinder control valve, arm cylinder control valve 27, bucket cylinder control valve, swing motor, left travel motor control valve and right travel motor control valve) when all the actuator control valves are in the non-feed states.

The displacement of the main pump 22 is controlled by a hydraulically-piloted regulator 63. By a flow-rate controlling, proportional solenoid valve 64, a pilot pressure to be applied to this regulator 63 is produced using the delivery pressure of the pilot pump 28 as a primary pressure. The displacement changes steplessly depending on the level of the pilot pressure.

By increasing the delivery flow rate of the main pump 22 via the flow-rate controlling, proportional solenoid valve 64 and regulator 63 in parallel with raising the delivery pressure of the main pump 22 via the boosting proportional solenoid valve 62 and boosting on/off valve 61, the engine output increases. As a result, it is possible to obtain an exhaust gas temperature required for forced regeneration that burns particulate matter deposited on the filter of the exhaust gas purification device. Therefore, the boosting on/off valve 61, boosting proportional solenoid valve 62, flow-rate controlling, proportional solenoid valve 64 and regulator 63 makes up a forced regeneration means for increasing the output of the engine 23 to raise the temperature of exhaust gas, and hence, burning particulate matter deposited on the filter of the exhaust gas purification device 25 with the heat of the temperature-raised exhaust gas.

As a forced regeneration command means for commanding the conduct of forced regeneration when operated by a part of the body, a forced regeneration switch 65 is arranged. This forced regeneration switch 65 is arranged in the operator's cab 9, although it is not depicted in FIG. 1-4. This forced regeneration switch 65 is a spring-return, push-button switch. A forced regeneration command signal So corresponding to an operated state of the forced regeneration switch 65 is inputted to the controller 60.

The controller 60 is arranged on a body of the hydraulic excavator 1, for example, in the operator's cab 9. The controller 60 is a unit, which is provided with CPU, ROM, RAM and the like and is operated in accordance with a computer program. This controller 60 is set to determine whether or not the lock detection signal S1 has been fed from the lock detection switch 52. Therefore, the lock detection switch 52 and controller 60 make up a non-operated state detection means for detecting an operated state of the gate lock on/off valve 51 (operation batch-invalidating means), that is, a non-operated state in which no drive pressure oil is fed to any of the left travel motor 5, right travel motor, boom cylinder 16, arm cylinder 17, bucket cylinder and swing motor.

Further, the controller 60 is set to control the boosting proportional solenoid valve 62 and flow-rate controlling, proportional solenoid valve 64. Therefore, the controller 60 is a control means for controlling the forced regeneration means.

The controller 60 is set to operate according to steps S1 to S6 illustrated in FIG. 1-3. The controller 60 is actuated in association with a stat-up of the engine 23. When the forced regeneration command signal So is inputted from the forced regeneration switch 65 after the start-up (YES in step S1), the controller 60 determines whether or not the input of the lock detection signal S1 from the lock detection switch 52 is continuing, namely, whether or not the gate lock lever 50 is in the locked state.

In parallel with this determination, the controller 60 also determines whether or not the arm angle signal Sa from the arm angle sensor 53 is equal to the angle corresponding to the stroke end of the arm cylinder 17 on its extended side, the bucket angle signal Sb from the bucket angle sensor 54 is equal to the angle corresponding to the stroke end of the bucket cylinder 18 on its extended side, and the boom pressure signal Spb from the boom pressure sensor 55 indicates a negative pressure, in other words, whether or not the front working mechanism 12 is in the proper attitude. As illustrated in FIG. 1-1, this proper attitude corresponds to an attitude that the bucket 15 has been folded toward the boom 13 as a result of the operations of both the arm cylinder 17 and bucket cylinder 18 to the stroke ends on the extend sides, and also corresponds to an attitude that the front working mechanism 12 is grounded (the attitude that the pressure of the bottom chamber 17*a*1 of the boom cylinder 16 has become a negative pressure). This proper attitude has been set beforehand as a safe attitude of the front working mechanism 12 upon conducting forced regeneration. Therefore, the arm angle sensor 53, bucket angle sensor 54, boom angle sensor 55 and controller 60 make up an attitude detection means for detecting a proper attitude specified beforehand as a safe attitude of the front working mechanism 12 (work element) during forced regeneration.

When the locked state of the gate lock lever 50 and the proper attitude are both detected by the determinations in step S2 (YES in step S2), the controller 60 makes the forced regeneration means (the boosting proportional solenoid valve 62, boosting on/off valve 61, flow-rate controlling, proportional solenoid valve 64 and regulator 63) initiate forced regeneration (step S3). In other words, preset control signals Cp, Cf are outputted to the boosting proportional solenoid valve 62 and flow-rate controlling, proportional solenoid valve 63, respectively. No forced regeneration is initiated unless the locked state of the gate lock lever 50 and the proper attitude have been both detected (NO in step S2).

The boosting proportional solenoid valve 62 to which the control signal Cp has been applied produces a pilot pressure, and this pilot pressure actuates the boosting on/off valve 61 toward the closed position, whereby the delivery pressure of the main pump 22 increases. The flow-rate controlling, proportional solenoid valve 64 to which the control signal Cf has been applied produces a pilot pressure, and this pilot pressure actuates the regulator 63 in the direction that the displacement is increased, whereby the delivery flow rate of the main pump 22 increases.

The engine 23 is set to be controlled in an idling state for energy saving and noise reduction in the locked state of the gate lock lever 50. However, the engine 23 is controlled to increase its output in association with a rise in the delivery pressure of the main pump 22 and an increase in its delivery flow rate. As a result of an increase in the output of the engine 23, the temperature of exhaust gas rises so that particulate matter burns with the heat of the exhaust gas, in other words, forced regeneration is conducted. During the forced regeneration, the controller 60 performs adjustments of the control signal Cp based on the delivery pressure indicated by the delivery pressure detection signal Spp to stabilize the delivery pressure of the main pump 22 at a predetermined pressure needed for the forced regeneration.

The controller 60 counts an elapsed time from the time point of the initiation of the output of the control signals Cp, Cf, and continues the output of the control signals Cp, Cf until elapse of a predetermined time as long as the detected state of both the locked state of the gate lock lever 50 and the proper attitude continues. When the continuous output time of the control signals Cp, Cf has passed the predetermined time (YES in step S4), the output of these control signals Cp, Cf is stopped to end the forced regeneration (step S5). It is to be noted that the predetermined time is set as a time sufficient to remove particulate matter from the filter of the exhaust gas purification device 25.

When both the locked state of the gate lock lever 50 and the proper attitude have become no longer detected before the elapse of the predetermined time (NO in step S4), on the other hand, the controller 60 stops the output of the control signals Cp, Cf at this time point, and stops the forced regeneration (step S6).

According to the hydraulic drive system 20 of the first embodiment, the following advantageous effects can be brought about.

With the hydraulic drive system 20, the delivery pressure of the main pump 22 is caused to rise to the predetermined pressure by the boosting on/off valve 61 upon conducting forced regeneration. At this time, the arm cylinder 17 and main pump 22 are cut off from each other, and so the bucket cylinder 18 and main pump 22. Nonetheless, there is a possibility that the predetermined pressure may act on either one or both of the arm cylinder 17 and bucket cylinder 18 by a leakage. The arm cylinder 17 and/or bucket cylinder 18 may be driven as a result of the application of the predetermined pressure. According to the hydraulic drive system 20, however, forced regeneration is not conducted unless not only the non-operated states of all the work hydraulic actuators and travel hydraulic actuator but also the proper attitude, which includes that both the arm cylinder 17 and bucket cylinder 18 as specific cylinders out of the work hydraulic actuators are in the stroke end states on their extended sides, are detected. Forced regeneration can, therefore, be conducted while avoiding false operations of the arm cylinder 17 and bucket cylinder 18. Accordingly, the hydraulic drive system 20 can provide the hydraulic excavator 1 with improved safety during forced regeneration.

In the hydraulic drive system 20, the proper attitude corresponds to the attitude that the bucket 15 has been folded toward the boom 13 as a result of the operations of both the arm cylinder 17 and bucket cylinder 18 to the stroke ends on the extend sides, and also corresponds to an attitude that the front working mechanism 12 is grounded. As a consequence, forced regeneration can be conducted in a state that the front working mechanism 12 is stabilized and hardly interferes with the surrounding.

According to the hydraulic drive system 20, the locked state of the gate lock lever 50 which operates the gate lock on/off valve 51 is detected by the lock detection switch 52. It is, therefore, possible to easily and collectively detect at one location that all the hydraulic actuators (the left travel motor 5, right travel motor, boom cylinder 16, arm cylinder 17, bucket cylinder 18 and swing motor) of the hydraulic excavator 1 are in non-operated states.

The hydraulic drive system 20 is constructed to cut off the feeding of a primary pressure to all the control devices such as the arm control device 29 by the gate lock on/off valve 51. This construction is commonly adopted in crawler hydraulic excavators. Therefore, the hydraulic drive system 20 makes it possible to provide a crawler hydraulic excavator with improved safety during forced regeneration.

In the above-described first embodiment, the forced regeneration means is constructed from the boosting proportional solenoid valve 62, boosting on/off valve 61, flow-rate controlling, proportional solenoid valve 64 and regulator 63. The forced regeneration means in the present invention is, however, not limited to such a construction. The forced regeneration means may be constructed from the boosting proportional solenoid valve 62 and boosting on/off valve 61 only, because depending on the capacity of the main pump 22, an engine output sufficient for forced regeneration can be obtained by simply raising the delivery pressure of the main pump 22.

[Second Embodiment]

Figures 1, 2, 3, 4:
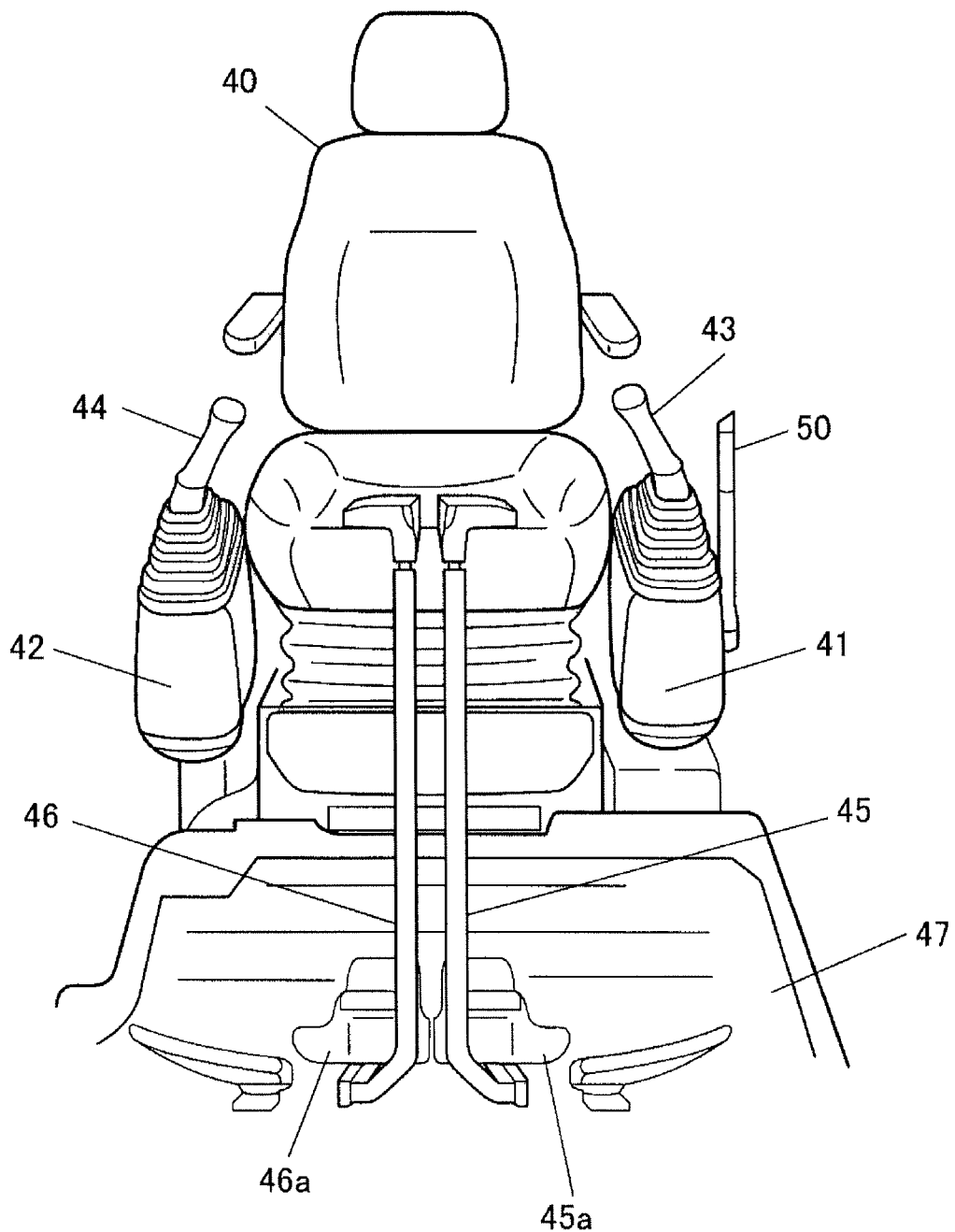
Figures 1, 2:
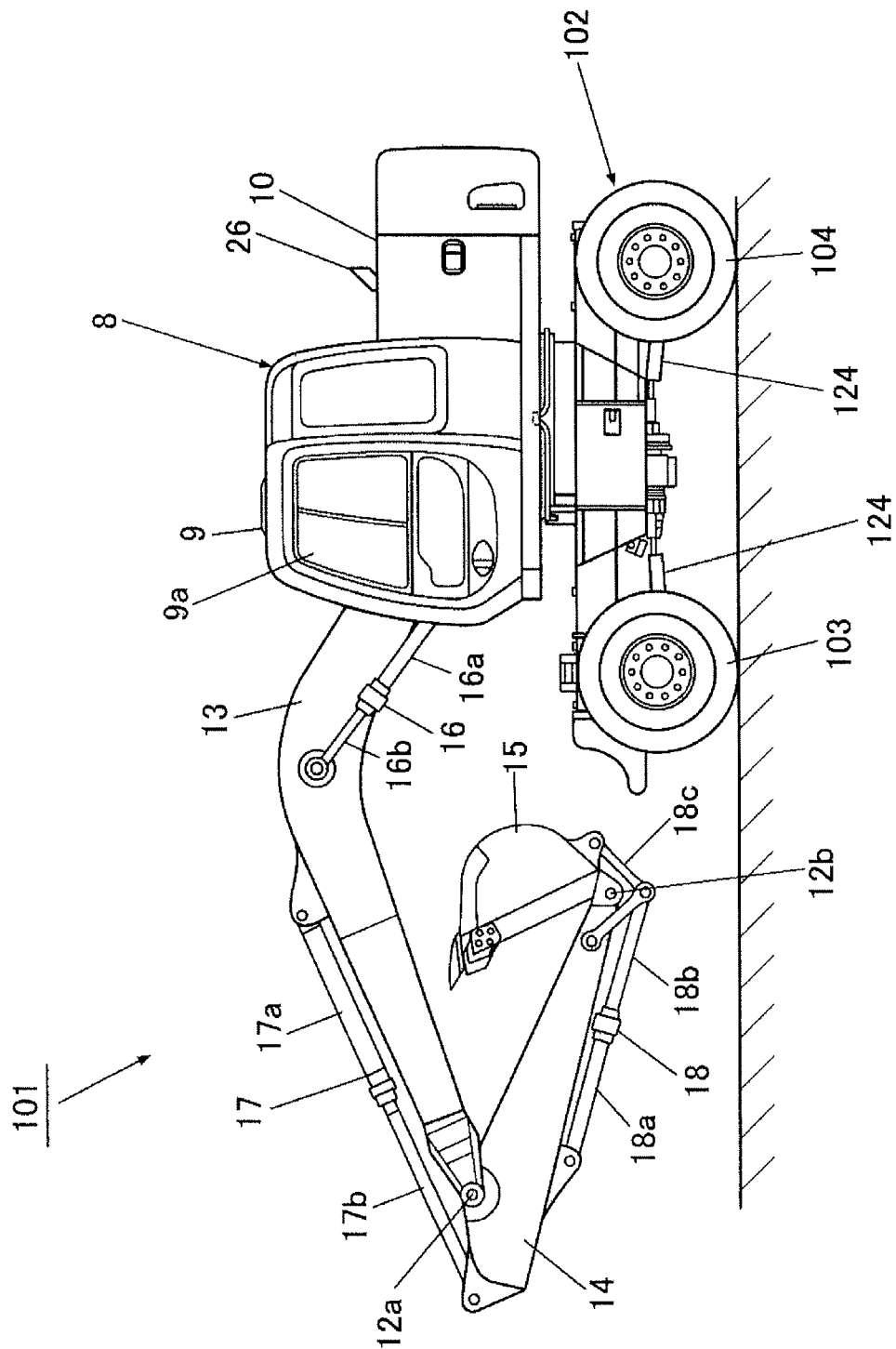
Figure 2:
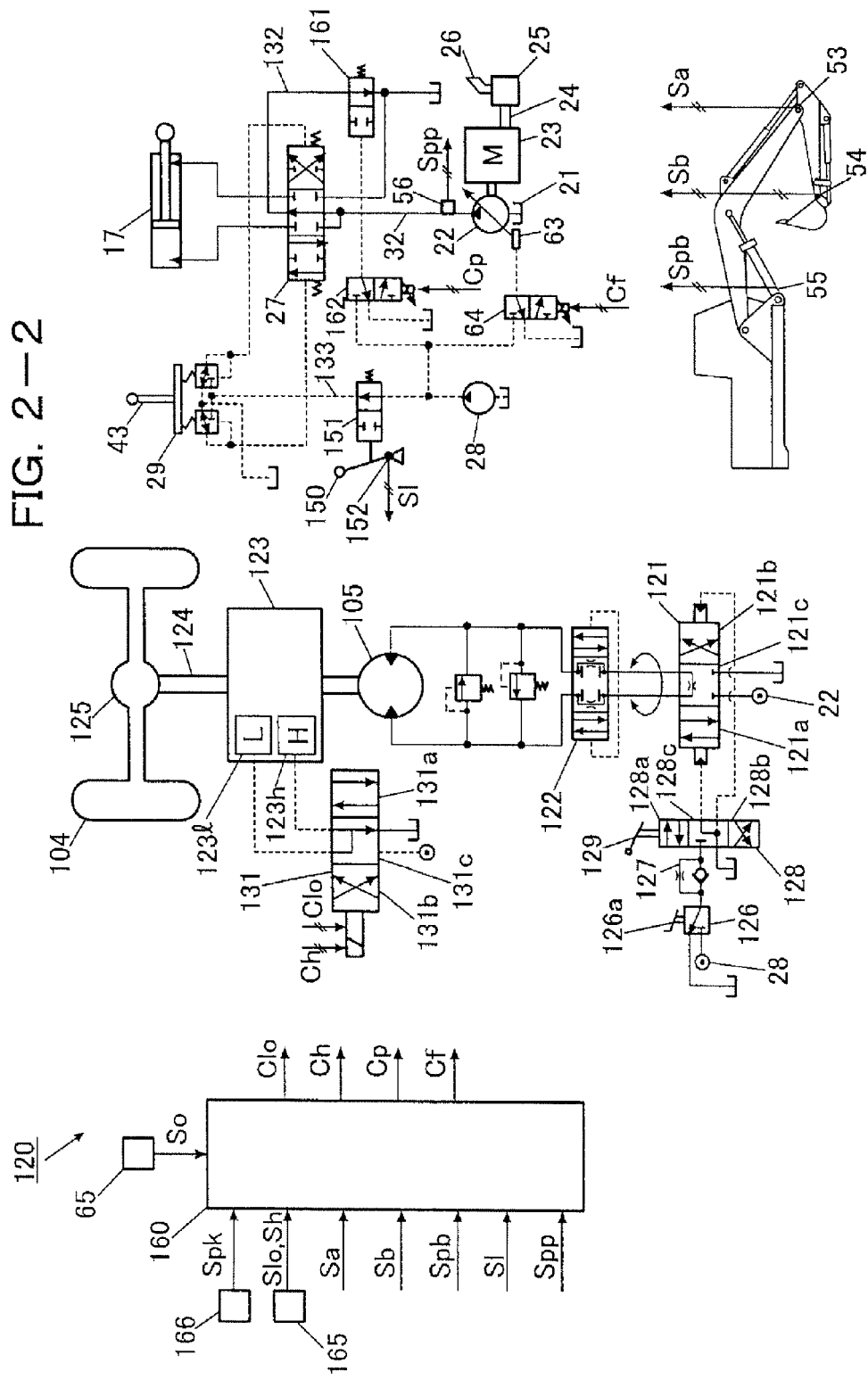
Figures 2, 3:
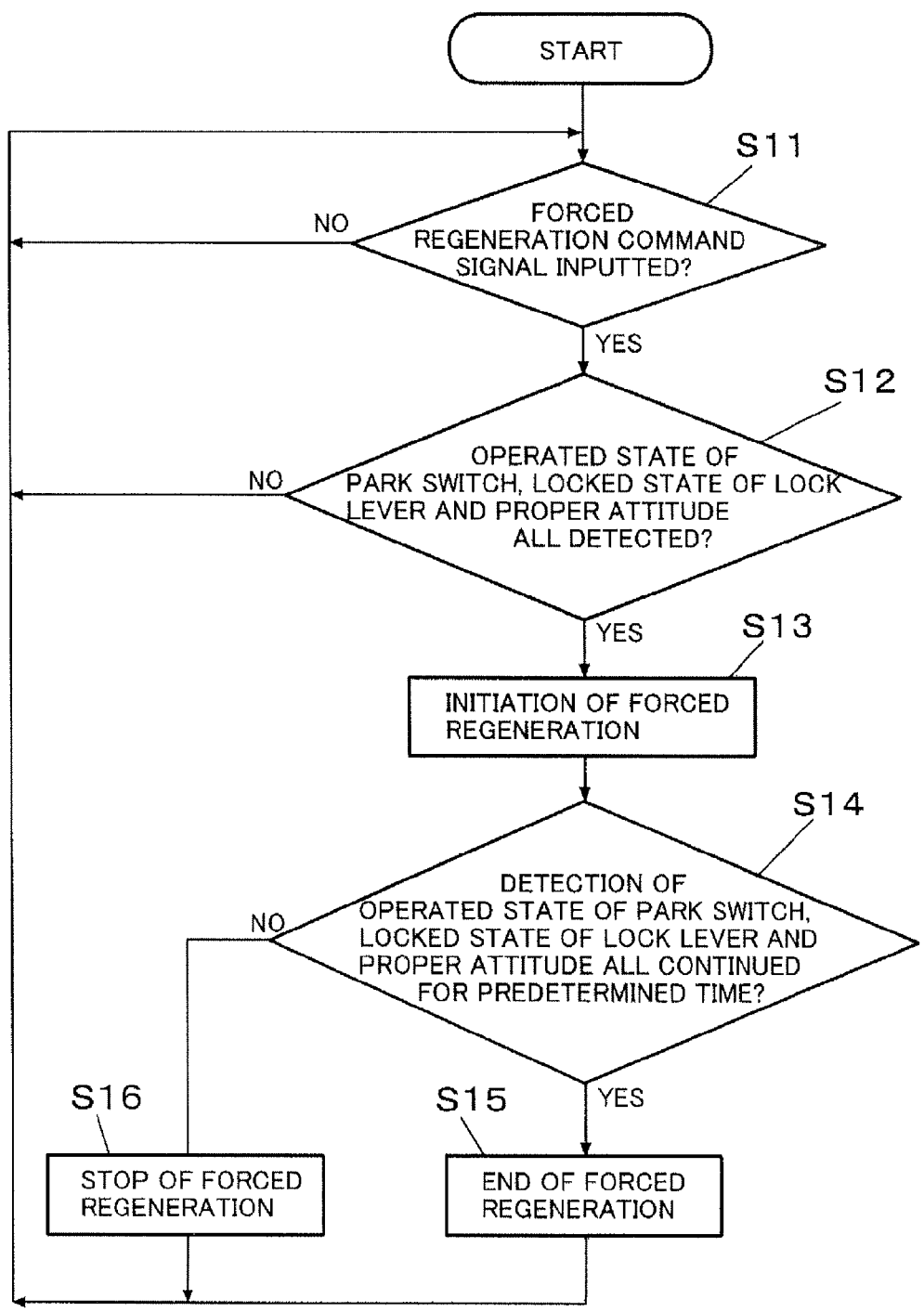
Figures 2, 3, 4:
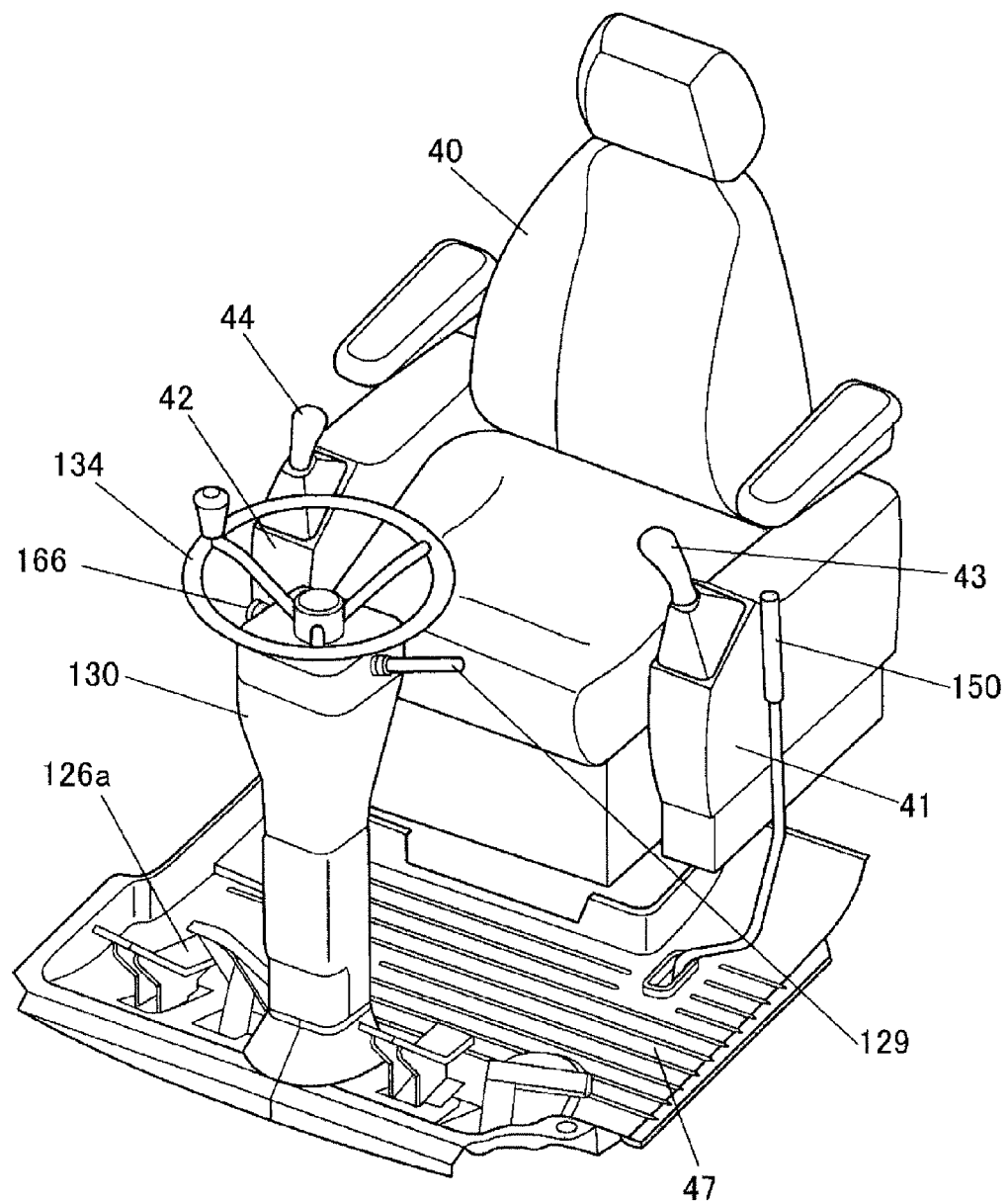

With reference to FIGS. 2-1 through 2-4, a description will be made about the second embodiment. FIG. 2-1 is a left side view of a wheel hydraulic excavator as a self-propelling working machine according to the second embodiment of the present invention. FIG. 2-2 is a hydraulic circuit diagram showing in a simplified form a hydraulic drive system arranged in the wheel hydraulic excavator illustrated in FIG. 2-1. FIG. 2-3 is a flow chart illustrating a flow of processing to be performed at a controller shown in FIG. 2-2. FIG. 2-4 is a perspective view of the inside of an operator's cab of the wheel hydraulic excavator illustrated in FIG. 2-1, as viewed from front of and obliquely above an operator's seat. Among elements and signals illustrated in FIGS. 2-1 through 2-4, like elements and signals to the corresponding ones illustrated in FIGS. 1-1 and 1-2 are designated using like reference signs.

A wheel hydraulic excavator 101 (hereinafter called "the hydraulic excavator 101") shown in FIG. 2-1 has a travel base 102. This travel base 102 has a pair of front wheels 103 and a pair of rear wheels 104, and travels by driving both the front wheels 103 and rear wheels 104. A travel hydraulic actuator as a drive source for the traveling is a travel motor 105 (hydraulic motor). The travel motor 105 is driven by the delivery oil fed from the main pump 22. Interposed between the main pump 22 and the travel motor 105 are a travel motor control valve 121 and a counterbalance valve 122. The travel motor control valve 121 controls the flow rate and direction of pressure oil to be fed from the main pump 22 to the travel motor 105. An output shaft of the travel motor 105 is arranged to transmit an output torque from a transmission 123 to both the front wheels 103 and rear wheels 104 via propeller shafts and axles. In FIG. 2-2, the propeller shaft and axle to transmit the output torque to the front wheels 103 and the propeller shaft and axle to transmit the output torque to the rear wheels 104 are simplified, and are collectively illustrated as the propeller shaft 124 and axle 125.

Valve positions of the travel motor control valve 121 are set at three positions, which are a forward-side position 121a where the direction of a flow of pressure oil to be fed to the travel motor 105 is controlled to a direction corresponding to a forward travel of the hydraulic excavator 101, a reverse-side position 121b where the direction of a flow of pressure oil to be fed to the travel motor 105 is controlled to a direction corresponding to a rearward travel of the hydraulic excavator 101, and a neutral position 121c where the feeding of pressure oil to the travel motor 105 is stopped.

The travel motor control valve 121 is hydraulically piloted, and by a pedal-operated pilot valve 126, a pilot pressure to be applied to this travel motor control valve 121 is produced using the delivery pressure of the pilot pump 28 as a primary pressure. An operation pedal, specifically an accelerator pedal 126a of the pilot valve 126 is arranged on the floor 47 at a location laterally rightward of a steering column 130 as depicted in FIG. 2-4. The pilot valve 126 is arranged corresponding to the travel motor 105, and is an actuation command means for producing a pilot pressure, as a command signal for the actuation of the travel motor 105, responsive to an operation of the accelerator pedal 126a.

As shown in FIG. 2-2, a slow-return valve 127 and directional control valve 128 are interposed between the pilot valve 126 and the travel motor control valve 121. The directional control valve 128 is operated by an F-N-R lever 129. Valve positions of the directional control valve 128 are set at three positions, which are a forward-side position 128a where a pilot pressure is guide in a direction to switch the travel motor control valve 121 to a forward-side position, a reverse-side position 128b where a pilot pressure is guided in a direction to switch the travel motor control valve 121 to a reverse-side position, and a neutral position 128c where no pilot pressure is fed to the travel motor control valve 121. As depicted in FIG. 2-4, the F-N-R lever 129 is arranged projecting laterally leftward from the left side wall of the steering column 130. It is to be noted that the hydraulic excavator 101 is provided with the F-N-R lever 129, steering wheel 134 and accelerator pedal 126a in place of the left travel control lever 45 and right travel control lever 46 in the first embodiment.

The transmission 123 has a planetary reduction gear mechanism, an L-side clutch 123l arranged on the side of a sun gear in the planetary reduction gear mechanism, and an H-side clutch 123h arranged on the side of a ring gear in the planetary reduction gear mechanism, and makes it possible to select the gear ratio from two levels consisting of "low gear" capable of producing low-speed/high-torque and "high gear" capable of producing high-speed/low-torque. The gear ratio of the "low gear" is set greater than that of the "high gear". The L-side clutch 123l and H-side clutch 123h are so-called negative clutches, each of which has a cylinder with a built-in spring, is biased by the spring in a connected state, and is brought into a released state when fed with pressure oil against the spring.

Pressure oil to be fed to each of the cylinder of the L-side clutch 123l and the cylinder of the H-side clutch 123h is controlled by a directional solenoid valve 131. The directional solenoid valve 131 is switched to an L-side position 131a when a control signal Clo is applied to a solenoid, and is switched to an H-side position 131b when a control signal Ch is applied to the solenoid. When neither of the control signals Clo, Ch are applied to the solenoid, the directional solenoid valve 131 is switched to a locked position 131c. When the valve position of the directional solenoid valve 131 is switched to the L-side position 131a, the pilot pressure is guided to the cylinder of the L-side clutch 123l and the pressure in the cylinder of the H-side clutch 123h drops to the reservoir pressure. As a result, a low gear state is created, in which the L-side clutch 123l is in the released state and the H-side clutch 123h is in the connected state. When the valve position of the directional solenoid valve 131 changes to the H-side position 131b, the pilot pressure is guided to the cylinder of the H-side clutch 123h, and the pressure in the cylinder of the L-side clutch 123l drops to the reservoir pressure. As a result, a high gear state is created, in which the H-side clutch 123h is in the released state and the L-side clutch 123l is in the connected state. When the valve position of the directional solenoid valve 131 changes to the locked position, the pressure in the cylinder of the L-side clutch 123l and the pressure in the cylinder of the H-side clutch 123h both drop to the reservoir pressure. As a result, the L-side clutch 123l and H-side clutch 123h are both brought into the connected states. In this state, the transmission 123 is locked and rotation of the propeller shaft 124 is prevented. In this locked state of the transmission 123, the transmission 123 functions as a travel-operation invalidating means to create a travel-operation invalidated state in which the hydraulic excavator 101 does not travel even when the pilot valve 126 as an actuation command means corresponding to the travel motor 105 (travel hydraulic actuator) is operated. This function is used as a parking brake.

In FIG. 2-2, numeral 160 indicates a controller, which is provided with CPU, ROM, RAM and the like and operates in accordance with a computer program. This controller 160 is arranged in the operator's cab 9 of the hydraulic excavator 101. To the controller 160, a low-gear command signal Slo or a high-gear command signal Sh is inputted from a shift switch 165. The shift switch 165 can be selectively held in a state, in which the low-gear command signal Slo is outputted, or in another state, in which the high-gear command signal Sh is outputted. The controller 160 continues to apply the control signal Clo to the solenoid of the directional solenoid valve 131 in a state that the input of the low-gear command signal Slo is continuing. On the other hand, the controller 160 continues to apply the control signal Ch to the solenoid of the directional solenoid valve 131 in a state that the input of the high-gear command signal Sh is continuing.

Further, the controller 160 is connected with a park switch 166. When this park switch 166 is in an operated state, the controller 160 is brought into a state in which neither of the control signals Clo, Ch are outputted. When the park switch 166 is in a non-operated state, the controller 160 is brought into a state in which these control signals Clo, Ch can be outputted. As depicted in FIG. 2-4, the park switch 166 is arranged on an upper part of a right side wall of the steering column 130.

In a hydraulic drive system 120, parallel circuits are formed between the main pump 22 and the arm cylinder control valve 27, boom cylinder control valve, bucket cylinder control valve and swing motor control valve (exclusive of the travel motor control valve 121). In a return line 132 extending from these parallel circuits to the hydraulic oil reservoir 21, a boosting on/off valve 161 of a similar construction as the boosting on/off valve 61 in the first embodiment is arranged. Using the delivery pressure of the pilot pump 28 as a primary pressure, a pilot pressure to be applied to the boosting on/off valve 161 is produced by a boosting proportional solenoid valve 162. Depending on the level of this pilot pressure, the opening degree of the boosting on/off valve 161 changes steplessly. This boosting on/off valve 161 is a boosting means for raising the delivery pressure of the main pump 22 by restricting the return line 132 downstream of all the boom cylinder control valve, arm cylinder control valve 27, bucket cylinder control valve and the swing motor when these control valves are all in the non-feed states.

A pilot line 133 extends from the pilot pump 28. Through this pilot line 113, the delivery oil of the pilot pump 28 is distributed to respective ones of the arm control device 29, boom control device, bucket control device and swing control device, which correspond to respective ones of arm cylinder control valve 27, boom cylinder control valve, bucket cylinder control valve and swing motor control valve (exclusive of the travel motor control valve 121). This pilot line 133 is provided with a gate lock on/off valve 151. When this gate lock on/off valve 151 is in the closed position, the gate lock on/off valve 151 is a work-operation invalidating means for creating, in a batch for all the control devices such as the arm control device 29 corresponding to the work hydraulic actuators such as the arm cylinder 17, work-operation invalidated states in which the work hydraulic actuators are not actuated even when the control devices corresponding to the work hydraulic actuators are operated. It is to be noted that to the travel motor control valve 121, the delivery oil of the pilot pump 28 is guided through another pilot line (not shown) which is not cut off by the gate lock on/off valve 151.

The controller 160 is set to determine whether or not the state of an application of the lock detection signal S1 from a lock detection switch 152 and the operated state of the park switch 166 have been both detected. Therefore, the lock detection switch 152, park switch 166 and controller 160 make up a non-operated state detection means for detecting operated states of both the transmission (travel-operation invalidating means) and the gate lock on/off valve 151 (work-operation invalidating means) as non-operated states of all the travel motor 105, boom cylinder 16, arm cylinder 17, bucket cylinder 18 and swing motor.

The controller 160 is set to operate according to steps S12 to S16 illustrated in FIG. 2-3. When the forced regeneration command signal So is inputted from the forced regeneration switch 65 (YES in step S11), the controller 60 determines as in the first embodiment whether or not the gate lock lever 150 is in the locked state and the hydraulic excavator 101 is in the proper attitude, and in addition to these determinations, also determines whether or not the operated state of the park switch 166 has been detected (step S12).

When the three states consisting of the locked state of the gate lock lever 150, the proper attitude and the operated state of the park switch 166 have been detected by the determinations in step S2 (YES in step S2), the controller 160, as in the first embodiment, outputs the control signals Cp, Cf to make the forced regeneration means (the boosting proportional solenoid valve 162, boosting on/off valve 161, flow-rate controlling, proportional solenoid valve 64 and regulator 63) initiate forced regeneration (step S13). No forced regeneration is initiated unless all the three states consisting of the locked state of the gate lock lever 150, the proper attitude and the operated state of the park switch 166 have been detected (NO in step S12).

The controller 160 counts an elapsed time from the time point of the initiation of the output of the control signals Cp, Cf, and continues the output of the control signals Cp, Cf until elapse of a predetermined time as long as the detected state of all the three states consisting of the locked state of the gate lock lever 150, the proper attitude and the operated state of the park switch 166 continues. When the continuous output time of the control signals Cp, Cf has passed the predetermined time (YES in step S14), the output of these control signals Cp, Cf is stopped to end the forced regeneration (step S15). It is to be noted that as in the first embodiment, the predetermined time is set as a time sufficient to remove particulate matter from the filter of the exhaust gas purification device 25.

When any one of the three states has become no longer detected before the elapse of the predetermined time (NO in step S14), on the other hand, the controller 160 stops the output of the control signals Cp, Cf at this time point, and stops the forced regeneration (step S16).

According to the hydraulic drive system 120 of the second embodiment, the following advantageous effects can be brought about.

With the hydraulic drive system 120, no forced regeneration is conducted, as in the hydraulic drive system 20 according to the first embodiment, unless all the work hydraulic actuators and travel hydraulic actuators are in non-operated states, and in addition, the proper attitude, including that both the arm cylinder 17 and bucket cylinder 18 as the specific cylinders out of the work hydraulic actuators are in the stroke-end states on the extended sides, has been detected. Forced regeneration can, therefore, be conducted while preventing false operations of the arm cylinder 17 and bucket cylinder 18. Accordingly, the hydraulic drive system 120 can provide the hydraulic excavator 101 with improved safety during forced regeneration.

In the hydraulic drive system 120, the proper attitude is set, as in the hydraulic drive system 20 according to the first embodiment, as the attitude that the bucket 15 has been folded toward the boom 13 as a result of the operations of both the arm cylinder 17 and bucket cylinder 18 to the stroke ends on the extend sides, and also as the attitude that the front working mechanism 12 is grounded. As a consequence, forced regeneration can be conducted in a state that the front working mechanism 12 is stabilized and hardly interferes with the surrounding.

In particular, the hydraulic drive system 120 according to the second embodiment has, different from the hydraulic drive system 20 according to the first embodiment, the construction that cuts off by the gate lock on/off valve 151 the feeding of a pilot pressure as a primary pressure to the arm control device 29, boom control device, bucket control device and swing control device and also the construction that locks the transmission 123 to prevent rotation of the propeller shaft 124. In general, these constructions can be adopted in wheel hydraulic excavators. According to the hydraulic drive system 120, wheel hydraulic excavators can be provided with improved safety during forced regeneration.

According to the hydraulic drive system 120, the locked state of the gate lock lever 150 which operates the gate lock on/off valve 151 is detected by the lock detection switch 152.

It is, therefore, possible to easily and collectively detect at one location that all the work hydraulic actuators (the boom cylinder 16, arm cylinder 17, bucket cylinder 18 and swing motor) are in non-operated states.

In the above-described second embodiment, the forced regeneration means is made up from the boosting proportional solenoid valve 162, boosting on/off valve 161, flow-rate controlling, proportional solenoid valve 64 and regulator 63. The forced regeneration means in the present invention is, however, not limited to such a construction. Depending on the capacity of the main pump 22, an engine output sufficient for forced regeneration can be obtained by simply raising the delivery pressure of the main pump 22. Therefore, the forced regeneration means may be constructed from the boosting proportional solenoid valve 162 and boosting on/off valve 161 only.

LEGEND

1 Hydraulic excavator
2 Travel base
3 Crawler track
4 Track frame
5 Travel motor
6 Drive wheel
7 Driven wheel
8 Revolving upperstructure
9 Operator's cab
9a Door
10 Engine compartment
11 Frame
12 Front working mechanism
12a, 12b Pin joints
13 Boom
14 Arm
15 Bucket
16 Boom cylinder
16a Cylinder tube
16b Rod
17 Arm cylinder
17a Cylinder tube
17a1 Bottom chamber
17a2 Rod chamber
17b Rod
18 Bucket cylinder
18a Cylinder tube
18b Rod
18c Link mechanism
20 Hydraulic drive system
21 Hydraulic oil reservoir
22 Main pump
23 Engine
24 Exhaust gas pipe
25 Exhaust gas purification device
26 Outlet pipe
27 Arm cylinder control valve
27a Initial position
27b First operating position
27c Second operating position
28 Pilot pump
29 Arm control device
30 Left travel control device
31 Right travel control device
32 Main line
33 Return line
34 Pilot line
40 Operator's seat
41, 42 Consoles
43 Swing/arm control lever
44 Boom/bucket control lever
45 Left travel control lever
45a Control pedal
46 Right travel control lever
46a Control pedal
47 Floor
50 Gate lock lever
51 Gate lock on/off valve
51a Open position
51b Closed position
52 Lock detection switch
53 Arm angle sensor
54 Bucket angle sensor
55 Boom pressure sensor
56 Delivery pressure sensor
60 Controller
61 Boosting on/off valve
61a Open position (initial position)
61b Closed position (operating position)
62 Boosting proportional solenoid valve
63 Regulator
64 Flow-rate controlling, proportional solenoid valve
65 Forced regeneration switch
101 Hydraulic excavator
102 Travel base
103 Front wheel
104 Rear wheel
105 Travel motor
120 Hydraulic drive system
121 Travel motor control valve
121a Forward-side position
121b Reverse-side position
121c Neutral position
122 Counterbalance valve
123 Transmission
123l L-side clutch
123h H-side clutch
124 Propeller shaft
125 Axle
126 Pilot valve
126a Accelerator pedal
127 Slow-return valve
128 Directional control valve
128a Forward-side position
128b Reverse-side position
128c Neutral position
129 F-N-R lever
130 Steering column
131 Directional solenoid valve
131a L-side position
131b H-side position
131c Locked position
132 Return line
133 Pilot line
134 Steering wheel
150 Gate lock lever
151 Gate lock on/off valve
152 Lock detection switch
160 Controller
161 Boosting on/off valve
162 Boosting proportional solenoid valve
165 Shift switch
166 Park switch

The invention claimed is:

1. A hydraulic drive system for a working machine, said hydraulic drive system being provided with plural work hydraulic actuators for driving a work element constituting the working machine, a hydraulic pressure source for producing, by a hydraulic pump, pressure oil to be fed to the plural work hydraulic actuators, an engine as a drive source for the hydraulic pump, an exhaust gas purification device for capturing, by a filter, particulate matter in exhaust gas produced by the engine, a forced regeneration means for burning particulate matter deposited on the filter, and a control means for controlling the forced regeneration means, wherein:

the hydraulic drive system is further provided with:
a forced regeneration command means for commanding conduct of forced regeneration when operated,
an attitude detection means for detecting a proper attitude specified beforehand as a safe attitude of the work element during forced regeneration, and
a non-operated state detection means for detecting that all the hydraulic actuators for driving the working machine, said hydraulic actuators including the plural work hydraulic actuators, are in non-operated states; and
taking as conditions for the conduct of forced regeneration that the non-operated states have been detected by the non-operated state detection means and the proper attitude has been detected by the attitude detection means, the control means makes the forced regeneration means conduct forced regeneration when the conduct of forced regeneration is commanded by the forced regeneration command means.

2. The hydraulic drive system according to the invention as described in claim 1, wherein:
the plural work hydraulic actuators are single-rod hydraulic cylinders;
control valves are arranged between the hydraulic pressure source and respective ones of the plural work hydraulic cylinders such that the control valves are switchable between feed states, in which pressure oil is fed from the hydraulic pressure source to the work hydraulic cylinders, and non-feed states, in which pressure oil is guided from the hydraulic pressure source to a hydraulic oil reservoir while cutting off flows of pressure oil from the hydraulic pressure source to the work hydraulic cylinders;
the forced regeneration means has a boosting means capable of raising a delivery pressure of the hydraulic pump to a predetermined pressure by restricting lines downstream of all the control valves when all the control valves are in the non-feed states; and
the attitude detection means detects, as an attribute of the proper attitude, that a specific cylinder out of the plural work hydraulic cylinders, said specific cylinder being drivable at the predetermined pressure, is in a stroke-end state on an extended side.

3. The hydraulic drive system according to the invention as described in claim 2, wherein:
the control means makes the forced regeneration means stop forced regeneration when the conditions have become no longer satisfied during the conduct of forced regeneration.

4. The hydraulic drive system according to the invention as described in claim 2, wherein:
the work element is a front working mechanism, and a grounded attitude of the front working mechanism is included as the attribute of the proper attitude.

5. The hydraulic drive system according to the invention as described in claim 1, wherein:
the control means makes the forced regeneration means stop forced regeneration when the conditions have become no longer satisfied during the conduct of forced regeneration.

6. The hydraulic drive system according to the invention as described in claim 1, wherein:
the working machine is self-propelling, and has a travel hydraulic actuator as a drive source for self-traveling;
actuation command means are arranged for the plural work hydraulic actuators and the travel hydraulic actuator, respectively, to produce command signals for the actuation of the respective hydraulic actuators depending on operations by corresponding parts of the body such as the hands and feet;
an operation batch-invalidating means is arranged to create, in a batch for all the operation command means, operation-invalidated states in which neither the work hydraulic actuators are actuated even when the actuation command means corresponding to the work hydraulic actuators are operated nor the travel hydraulic actuator is actuated even when the actuation command means corresponding to the travel hydraulic actuator is operated; and
the non-operated state detection means detects an actuated state of the operation batch-invalidating means as the non-operated states.

7. The hydraulic drive system according to the invention as described in claim 1, wherein:
the working machine is self-propelling, and has a travel hydraulic actuator as a drive source for self-traveling;
actuation command means are arranged for the plural work hydraulic actuators and the travel hydraulic actuator, respectively, to produce command signals for the actuation of the respective hydraulic actuators depending on operations by corresponding parts of the body such as the hands and feet;
a travel-operation invalidating means is arranged to create a travel-operation invalidated state in which the working machine does not travel even when the actuation command means corresponding to the travel hydraulic actuator is operated, and a work-operation invalidating means is also arranged to create a work-operation invalidated state in which the work hydraulic actuators are not actuated even when the actuation command means corresponding to the work hydraulic actuators are operated; and
the non-operated state detection means detects as the non-operated states that the travel-operation invalidating means and work-operation invalidating means are both in operated states.

8. The hydraulic drive system according to the invention as described in claim 1, wherein:
the work element is a front working mechanism, and a grounded attitude of the front working mechanism is included as the attribute of the proper attitude.

* * * * *